United States Patent
Ishida

(10) Patent No.: US 6,456,283 B1
(45) Date of Patent: Sep. 24, 2002

(54) METHOD AND SYSTEM FOR GENERATING IMAGE IN COMPUTER GRAPHICS

(75) Inventor: Hirofumi Ishida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/773,951

(22) Filed: Dec. 26, 1996

(30) Foreign Application Priority Data

Dec. 25, 1995 (JP) ............................................. 7-350938

(51) Int. Cl.$^7$ ................................................ G06T 15/40
(52) U.S. Cl. ...................................... 345/421; 345/441
(58) Field of Search ................................ 345/421, 422, 345/441, 622, 623, 609

(56) References Cited

U.S. PATENT DOCUMENTS

| | | | | |
|---|---|---|---|---|
| 5,056,044 A | * | 10/1991 | Frederickson et al. | 345/422 |
| 5,734,806 A | * | 3/1998 | Narayanaswami | 345/422 |
| 5,808,617 A | * | 9/1998 | Kenworthy et al. | 345/421 |
| 5,825,363 A | * | 10/1998 | Anderson | 345/421 |
| 5,850,224 A | * | 12/1998 | Sakuraba | 345/421 |
| 6,285,378 B1 | * | 9/2001 | Duluk, Jr. | 345/441 |

FOREIGN PATENT DOCUMENTS

| | | |
|---|---|---|
| JP | 62-222379 | 9/1987 |
| JP | 1-112377 | 5/1989 |
| JP | 3-255589 | 11/1991 |

OTHER PUBLICATIONS

Foley et al, "Computer Graphics: Principles and Practice", pps. 883–886, 1990.*

* cited by examiner

*Primary Examiner*—Jeffery Brier
*Assistant Examiner*—Faranak Fouladi-Semnani
(74) *Attorney, Agent, or Firm*—Foley & Lardner

(57) ABSTRACT

It is an object to speedily generate a hidden surface removed image, by dividing one picture frame into a plurality of rectangular blocks and by repeating generation of a hidden surface removed block image.

A block segmenting section 22 seeks, on the basis of primitive information from a primitive information setting section 21, in-block span information obtained when a primitive is segmented into a collection of in-block spans so that a projected image of the primitive completely falls in one block. The block segmenting section also seeks block information indicating a block including a projected image of the primitive projected onto a picture plane. A pixel processing section 24 seeks, from the in-block span information from an in-block span storing section 23, the pixel value of pixels included in the in-block span, and reads out the depth value in the block stored in a cache memory 27 by action of a cache controlling section 26, to compare the read-out depth value with the depth value of the pixel, and to write the pixel values which can be viewed from a viewpoint, into in the cache memory 27 by action of the cache controlling section 26.

10 Claims, 10 Drawing Sheets

METHOD AND SYSTEM FOR GENERATING IMAGE IN COMPUTER GRAPHICS

BACKGROUND OF THE INVENTION

1. Field of the Invention

The present invention relates to a method and system for generating an image in computer graphics, and more specifically to an image generating method and system capable of speedily executing a hidden surface removal.

2. Description of the Related Art

It is known to use a Z-buffer method as an image generating method for generating a hidden surface removed image of a three-dimensional object in computer graphics (for example, Japanese Patent Application Pre-examination Publication No. JP-A-62-222379). The Z buffer method uses a Z buffer storing a depth value of each pixel, indicative of the distance from a viewpoint to each pixel, in the amount of one frame. The Z-buffer also stores a frame buffer storing a brightness value of each pixel, indicative of the brightness of each pixel, in the amount of one frame. For each pixel, the depth value stored in the Z buffer is compared with the depth value of a newly calculated three-dimensional object. The depth value nearer to the viewpoint and the corresponding brightness value are left in the Z buffer and the frame buffer, so that a hidden surface removed image is finally generated in the frame buffer. In this method, it is necessary to read, modify and write to the frame buffer for each of pixels included in a projected image formed by projecting the three-dimensional object onto a picture plane. Therefore, in order to speedily execute the image generation, it is necessary to speedily perform a random access to a large capacity memory which constitutes the frame buffer.

A high speed memory, called SRAM (static random accesses memory) is used in a method for speedily performing a random access to the memory, in order to increase the bus band width of the memory. Alternatively, memories have been operated in a parallel.

In the above mentioned conventional image generation method, in order to speedily perform the random access to the frame buffer, an expensive memory has been used, or alternatively, in order to operate memories in parallel, it has been necessary to use a large number of memories and to increase the number of signal lines in accordance with the degree of parallelism. Therefore, there was a problem in that the apparatus became large scale and expensive.

On the other hand, a large-capacity, low-cost, high-speed-accessible memory such as a high speed DRAM (dynamic random access memory) has recently started to be manufactured. However, since there is a restriction that the random access cannot be freely performed, there occurs a problem in which the performance of the memory cannot be sufficiently utilized in the conventional Z-buffer method.

SUMMARY OF THE INVENTION

It is an object of the present invention to provide image generating method and system in computer graphics, which have overcome the above mentioned problems of the prior art.

Another object of the present invention is to provide image generating method and system capable of speedily generating an image even with a low-cost memory such as a high speed DRAM, by dividing a picture frame into a plurality of rectangular blocks (hereinafter, "block") and repeating generation of a hidden surface removed block image.

One example of a prior art using a procedure for dividing picture data into a plurality of block areas is disclosed by Japanese Patent Application Pre-examination Publication No. JP-A-01-112377 entitled "Picture Information Processor". However, this apparatus is configured to encode in units of blocks, and is completely different in object and in construction from the present invention.

In an image generation method for generating a hidden surface removed image, an object located in a three-dimensional space being defined as a collection of primitives which are fundamental shapes, and a hidden surface removal being conducted on the basis of a depth value indicating a distance from a viewpoint to each of pixels in a picture frame composed of pixels arranged in the form of matrix, the method in accordance with the present invention is characterized by including dividing the picture frame into a plurality of rectangular blocks, preparing a cache memory for storing a brightness value and a depth value of each pixel, in the amount of at least one block, and repeating a processing including to segment the primitive into a collection of in-block spans which are completely included in one block, and to generate on the basis of the collection of in-block spans a hidden surface removed block image in the cache memory, whereby an image of one picture frame is generated.

Alternatively, in an image generation method for generating a hidden surface removed image, an object located in a three-dimensional space being defined as a collection of primitives which are fundamental shapes, and a hidden surface removal being conducted by using a Z buffer and a frame buffer, which correspond to position of pixels in a picture frame composed of pixels arranged in the form of matrix, and which respectively store a depth value indicating a distance from a viewpoint to each pixel and a brightness value indicating a brightness of each pixel, on the basis of the depth value, the method in accordance with the present invention is characterized by including:

a cache initializing step for initializing into an empty condition a cache memory capable of storing pixel values in the amount of at least one rectangular block of a plurality of rectangular blocks obtained when the picture frame is divided into the plurality of rectangular blocks;

a step for discriminating whether or not a primitive exists, in which if in all the primitives constituting the object there exists a primitive which has not yet been extracted, the primitive is extracted, and if there is no primitive which has not yet been extracted, the processing goes into an ending processing;

a projected block extracting step for extracting all blocks including a projected image of the primitives projected onto the picture frame;

a step for discriminating whether or not a block exists, in which if in all the blocks including the projected image of the primitives projected onto the picture frame, there exists a block which has not yet been extracted, the block is extracted, and if there is no block which has not yet been extracted, the processing returns into the step for discriminating whether or not the primitive exists;

a cache replacement step in which if the pixel values of the extracted block are not stored in the cache memory, the pixel values of the extracted block are written into the cache memory, and when the cache memory stores the pixel values of another block and therefore the pixel values of the extracted block are overwritten into the cache memory, the pixel values of the another block are written into the Z buffer and the frame buffer;

an in-block span generating step for seeking in-block span information obtained when the primitive is segmented into a collection of in-block spans so that a projected image of the primitive completely falls in the extracted block;

a block image generating step for obtaining the pixel values of the pixels included in the in-block spans from the in-block span information, comparing the depth values of the pixel values with the depth values of the extracted block stored in the cache memory, and preserving, in the cache memory, the pixel values of the in-block spans which can be viewed from the viewpoint, and then, returning to the step for discriminating whether or not the block exists; and a cache exhausting step for writing the brightness values stored in the cache memory into the frame buffer, as the ending processing in the step for discriminating whether or not the primitive exists.

Furthermore, the image generation method in accordance with the present invention is also characterized in that, in the cache replacement step, if the pixel values of the extracted block are not stored in the cache memory, the pixel values of the extracted block are written into the cache memory, and when the cache memory stores the pixel values of another block and therefore the pixel values of the extracted block are overwritten into the cache memory, only modified pixel values of the pixel values of the another block are written into the Z buffer and the frame buffer.

Moreover, in an image generation method for generating a hidden surface removed image, an object located in a three-dimensional space being defined as a collection of primitives which are fundamental shapes, and a hidden surface removal being generated, in a frame buffer which corresponds to pixels in a picture frame composed of pixels arranged in the form of matrix and which stores a brightness value indicating a brightness of each pixel, on the basis of a depth value indicating a distance from a viewpoint of the primitive to each pixel, the method in accordance with the present invention is characterized by including:

a cache initializing step for initializing into an empty condition a cache memory capable of storing pixel values composed of the brightness values and the depth values of the pixels, in the amount of at least one rectangular block of a plurality of rectangular blocks obtained when the picture frame is divided into the plurality of rectangular blocks;

an all-primitive position calculating step for determining and storing, for all the primitives, position information indicating a block having possibility of including a projected image of each primitive;

a step for discriminating whether or not a block exists, in which if in all the blocks constituting the picture frame, there exists one or more blocks which have not yet been extracted, one block is extracted in an arrangement order on the picture frame;

a primitive extracting step for extracting, on the basis of the position information, all primitives each having possibility that a projected image of that primitive is included in the extracted block;

a step for discriminating whether or not a primitive exists, in which if in all the primitives extracted, there exists a primitive which has not yet been extracted, the primitive is extracted, and if there is no primitive which has not yet been extracted, the processing goes into an ending processing;

an in-block span generating step for seeking in-block span information obtained when the extracted primitive is segmented into a collection of in-block spans so that a projected image of the extracted primitive completely falls in the extracted block;

a block image generating step for obtaining, from the in-block span information, the pixel values of the pixels included in the in-block spans from the in-block span information, comparing the depth values of the pixel values with the depth values of the extracted block stored in the cache memory, and preserving, in the cache memory, the pixel values of the primitive which can be viewed from the viewpoint, and then, returning to the step for discriminating whether or not the primitive exists; and a cache exhausting step for writing the brightness values stored in the cache memory into the frame buffer, and initializing the cache memory into the empty condition, as the ending processing in the step for discriminating whether or not the primitive exists, and then, for returning to the step for discriminating whether or not the block exists.

On the other hand, an image generation apparatus in accordance with the present invention is characterized by comprising:

a primitive setting section for setting primitive information indicating each of primitives when an object located in a three-dimensional space is defined as a collection of primitives which are fundamental shapes;

a memory including a Z buffer and a frame buffer, which respectively store a depth value indicating a distance from a viewpoint to each of pixels of the picture frame and a brightness value indicating a brightness of each pixel;

a cache memory capable of storing pixel values each composed of the depth value and the brightness value of each pixel, in the amount of at least one rectangular block of a plurality of rectangular blocks obtained when the picture frame is divided into the plurality of rectangular blocks;

a block segmenting section for seeking, on the basis of the primitive information, in-block span information obtained when the primitive is segmented into a collection of in-block spans so that a projected image of the primitive completely falls in one block, the block segmenting section also seeking block information indicating a block including a projected image of the primitive projected onto the picture frame;

an in-block span storing section for storing the in-block span information;

a cache controlling section operating on the basis of the block information to writing the pixel values of the block into the cache memory from the memory if the pixel values of the block are not stored in the cache memory, the cache controlling section operating, when the cache memory stores the pixel values of another block and therefore the pixel values of the block are overwritten into the cache memory, to write the pixel values of the another block into the memory, the cache controlling section reading from the in-block span storing section the in-block span information indicating the in-block span projected onto the block;

a pixel processing section for seeking from the in-block span information the pixel value of the pixel included in the in-block span, and reading out the depth value in the block stored in the cache memory by action of the cache controlling section, to compare the read-out depth value with the depth value of the pixel, and further writing the pixel values which can be viewed from the viewpoint, into in the cache memory by action of the cache controlling section; and an image display for displaying the image stored in the frame buffer.

Furthermore, the image generation apparatus in accordance with the present invention is also characterized in that the cache controlling section has a flag indicating whether or not each block has been used, and performs such a control that for a block which has not yet been used, the pixel values are not read out from the memory to be written into the cache memory.

In addition, the image generation apparatus in accordance with the present invention is also characterized in that the cache controlling section performs such a control that when the pixel values of the another block are written into the memory, unmodified pixels values are not written into the memory.

Alternative, the image generation apparatus in accordance with the present invention is also characterized in that the cache controlling section has a flag indicating whether or not each block has been used, and performs such a control that for a block which has not yet been used, the depth values are not read out from the memory to be written into the cache memory.

Still further, an image generation apparatus in accordance with the present invention is characterized by comprising:

a primitive setting and storing section for setting and storing primitive information indicating each of primitives when an object located in a three-dimensional space is defined as a collection of primitives which are fundamental shapes, a memory storing a brightness value indicating a brightness of the primitive in each of pixels of the picture frame;

a cache memory capable of storing pixel values each composed of a depth value indicating a distance from a viewpoint to each pixel and the brightness value of each pixel, in the amount of at least one rectangular block of a plurality of rectangular blocks obtained when the picture frame is divided into the plurality of rectangular blocks;

a block sorting section for reading, from the primitive setting. and storing section in the arrangement order of the blocks in the picture frame, the primitive information indicating the primitive having possibility that a projected image of the primitive is included in the block, the block sorting section generating an end information for notifying the ending of the block;

a block segmenting section for seeking, on the basis of the primitive information, in-block span information obtained when the primitive is segmented into a collection of in-block spans so that a projected image of the primitive completely falls in one block;

an in-block span storing section for storing the in-block span information;

a cache controlling section responding to the end information to read from the in-block span storing section the in-block span information indicating the in-block span projected onto the block, and for writing the brightness values stored in the cache memory into the frame buffer when the processing for the block is completed;

a pixel processing section for seeking from the in-block span information the pixel value of the pixel included in the in-block span, and reading out the depth value in the block stored in the cache memory by action of the cache controlling section, to compare the read-out depth value with the depth value of the pixel, and further writing the pixel values which can be viewed from the viewpoint, into in the cache memory by action of the cache controlling section; and an image display for displaying the image stored in the frame buffer.

DETAILED DESCRIPTION OF THE PREFERRED EMBODIMENT

Now, embodiments of the present invention will be described with reference to the accompanying drawings.

Figure 1:
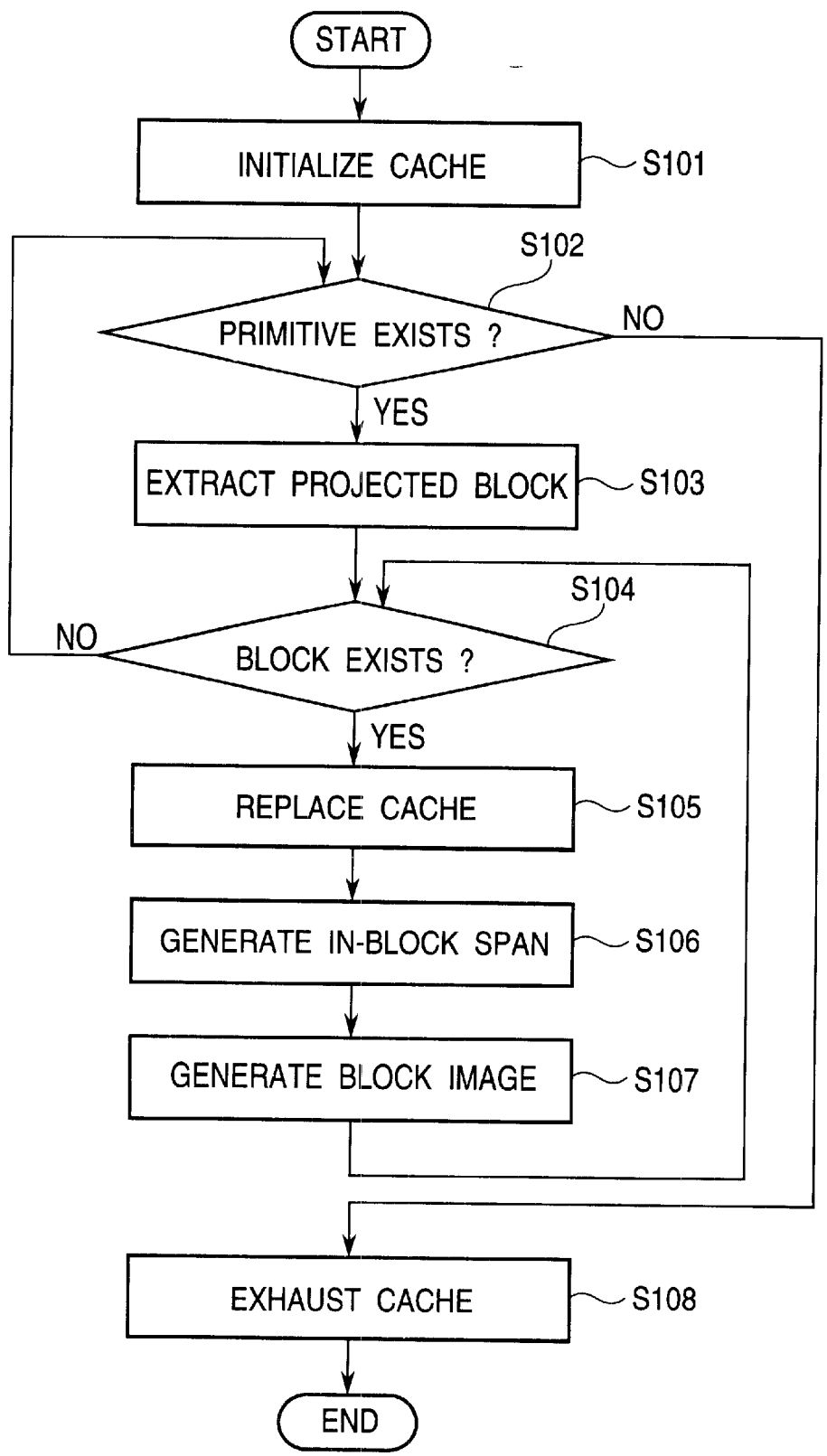
FIG. 1 is a flow chart illustrating the process of the image generation method in accordance with a first embodiment of the present invention.

FIG. 1 is a flow chart illustrating the process of the image generation method in accordance with the first embodiment of the present invention. As shown in FIG. 1, this image generation method includes a step S101 for initializing a cache, a step S102 for discriminating whether or not a primitive exists, a step S103 for extracting a projected block, a step S104 for discriminating whether or not a block exists, a step S105 for replacing the cache content, a step S106 for generating an in-block span, a step S107 for generating a block image, and a step S108 for exhausting the cache content.

Figure 2:
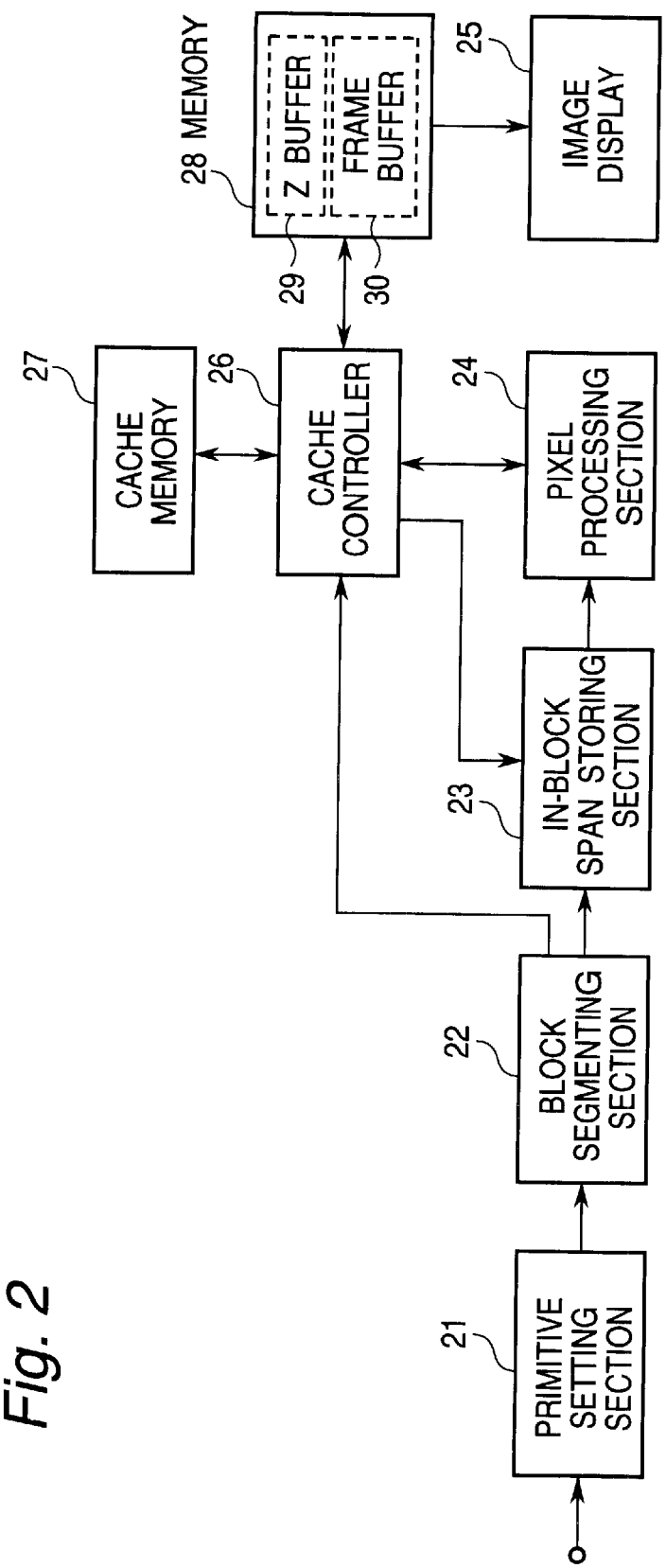
FIG. 2 is a block diagram showing the image generation apparatus in accordance with the first embodiment of the present invention.

FIG. 2 is a block diagram showing the image generation apparatus in accordance with the first embodiment of the present invention. As shown in FIG. 2, the image generation apparatus comprises a primitive setting section 21, a block segmenting section 22, an in-block span storing section 23, a pixel processing section 24, an image display 25, a cache controller 26, a cache memory 27 and a memory 28 including a Z buffer 29 and a frame buffer 30. The cache 27 is formed, for example, of SRAM, and the memory 28 is formed, for example, of DRAM.

Figure 4:
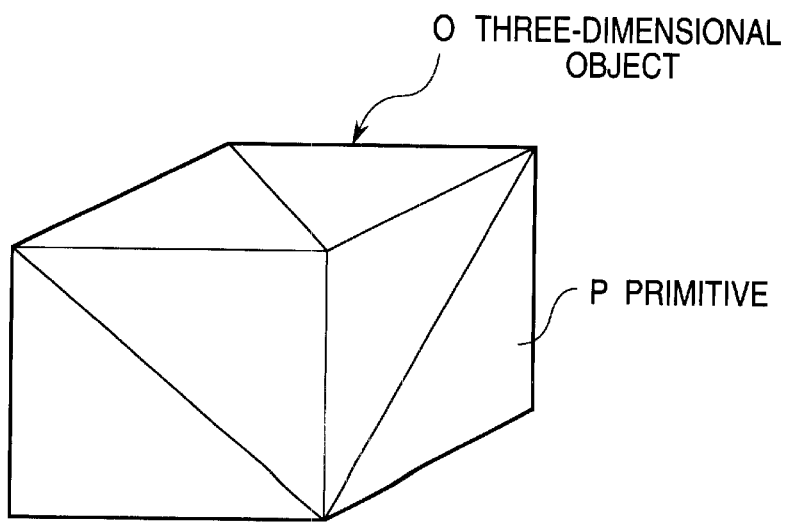
FIG. 4 is a view illustrating one example of a three-dimensional object and a "primitive", in the image generation method in accordance with the first embodiment of the present invention.

The primitive setting section 21 receives primitive information indicating primitives "P" (See FIG. 4) constituting a three-dimensional object "O" (See FIG. 4). The primitive information can be inputted directly by use of a keyboard, or from a memory medium such as a main memory or a floppy disk. Alternatively, the primitive information can be inputted from another apparatus through a network.

The block segmenting section 22, segments a projected image "PI" (See FIG. 9) of the primitive "P" (See FIG. 9) into in-block spans "L" (See FIG. 9), and causes the in-block span storing section 23 to store in-block span information. In addition, the block segmenting section 22 supplies a position of a block "B" (See FIG. 3) in which the generated in-block spans "L" are included, as block information, to the cache controller 26.

The in-block span storing section 23 stores the in-block span information.

The pixel processing section 24 seeks pixel values included in the in-block spans "L", on the basis of the in-block span information supplied from the in-block span storing section 23, and generates a hidden surface removed image in the cache memory 27.

However, the reading of the pixel value from the cache memory 27 and the writing of the pixel value to the cache memory 27 are performed through the cache controller 26.

The image display 25 reads brightness values from the frame buffer 30 of the memory 28 and displays an image. However, in the case where there are provided two frame buffers 30 for storing the brightness values, the image display 25 displays the image stored in the frame buffer which is not accessed by the cache controller 26. With this arrangement, it becomes possible not to display an image generation process, so that a smooth moving image can be displayed.

The cache controller 26 first initializes the cache memory 27. Then, the cache controller 26 investigates, on the basis of the block information supplied from the block segmenting section 22, whether or not the brightness values and the depth values of the block "B" of the block information are stored in the cache memory 27. If they are not stored in the cache memory 27, the cache controller 26 reads the depth values and the brightness values from Z buffer 29 and frame buffer 30 of memory 28. The cache controller 26 also writes depth values and the brightness values of another block stored in the cache memory 27 into the Z buffer 29 and the frame buffer 30 of the memory 28. The block written into Z-buffer 29 and frame buffer 30 is the block which will be overwritten with the brightness values and depth values of Block "B." If the depth values and the brightness values of the block "B" have been prepared in the cache memory 27, the cache controller 26 reads the in-block span information from the in-block span storing section 23 and supplies the read-out in-block span information to the pixel processing section 24.

The cache memory 27 has the memory capacity capable of storing the depth values and the brightness values of a plurality of blocks. By increasing the memory capacity of the cache memory 27, it is possible to elevate a cache hit rate, and therefore, it is possible to reduce the amount of data transferred between the cache memory 27 and the memory 28, so that the image generation can be executed more speedily.

The memory 28 includes the Z buffer 29 having the memory capacity capable of storing the depth value of each of the pixels within the primitives "P", in the amount of one frame. The memory 28 also includes the frame buffer 30 having the memory capacity capable of storing the brightness value of each of the pixels within the primitives "P", in the amount of one frame. Alternatively, the frame buffer 30 for storing the brightness values can be modified to have the memory capacity capable of storing the brightness values corresponding to two frames, so that when one of the two frames are displayed, the image generation of the other frame can be performed.

Figure 3:
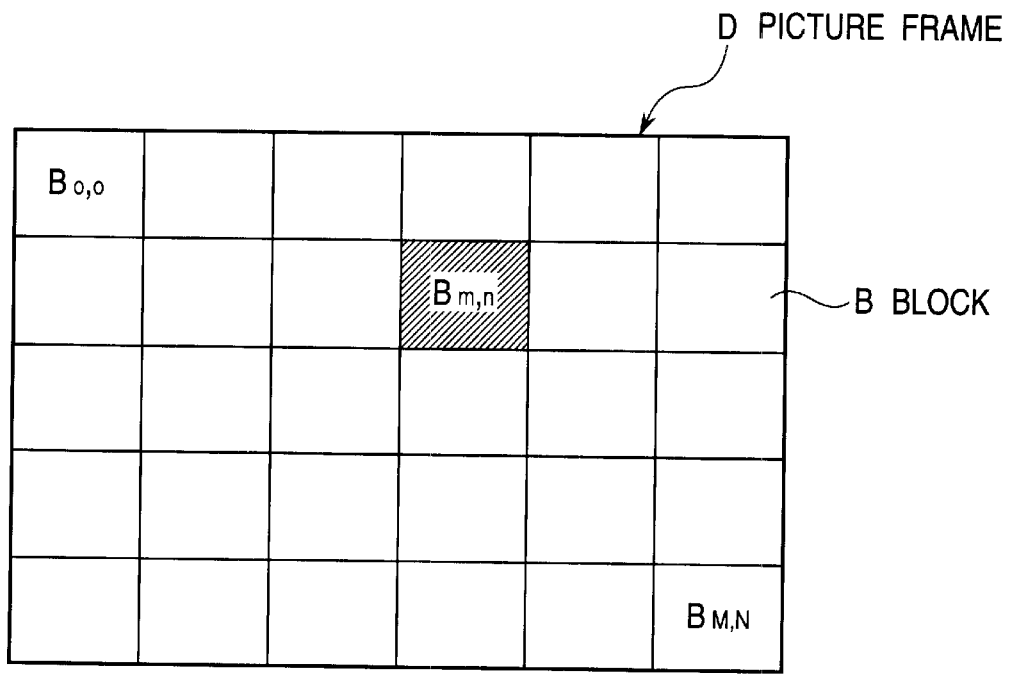
FIG. 3 is a view illustrating one example of the method for dividing a picture frame into blocks, in the image generation method in accordance with the first embodiment of the present invention.

FIG. 3 is a view illustrating one example of the method for dividing the picture frame "D" into blocks. As shown in FIG. 3, the method for dividing the picture frame "D" divides the picture frame into a plurality of rectangular blocks Bm,n (m=0 to M, n=0 to N) having the same size. Each block, Bm,n preferably contains "k" pixels in a horizontal direction and "1" pixels in a vertical direction (k and 1 are positive integer). The cache memory 27 has one or more regions each capable of storing the pixel values of one block. For example, consider that the picture frame size is 640×480 and the block size is 16×8 (k=16, 1=8). In this case, in the horizontal direction, 40 (=640/16) blocks are arranged, and in the vertical direction, 60 (=480/8) blocks are arranged. If the frame size such as 642×481 cannot be divided with no remainder, the frame size is enlarged to the size such as 656×488 which can be divided with no remainder, and only a necessary region included in the enlarge frame size is utilized.

FIG. 4 is a view illustrating one example of a three-dimensional object "O" and primitives "P". As shown in FIG. 4, the three-dimensional object "O" is constituted of a plurality of primitives "P". The primitive "P" can be a triangle as shown in FIG. 4, or a polygon having the number of angles larger than that of the triangle. Alternatively, the primitive "P" can be a portion of a curved surface. Information indicative of the primitive "P" includes information for determining the boundary of the primitive "P" and information for obtaining red (R), green (G) and blue (B) components of the brightness value in the inside of the primitive "P". In particular, if the primitive "P" is constituted of a polygonal surface, the information for determining the boundary of the primitive "P" can be coordinate values of vertices of the polygon, or a starting point and an inclination of boundary line segments. On the other hand, the information for obtaining the brightness value in the inside of the primitive "P", can be the brightness value of the vertex, or an address indicating a position within a table previously storing the brightness values. Alternatively, it can be information such as an initial value and an increment value of the brightness value and the address.

Figure 5:
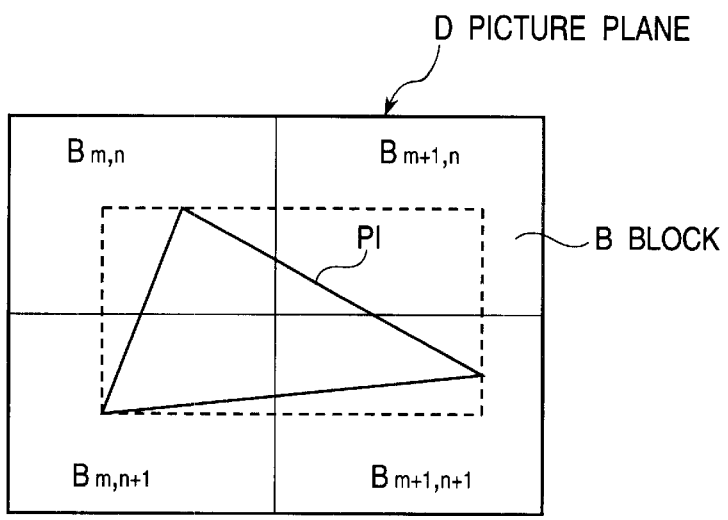
FIG. 5 is a view illustrating one example of the method for extracting blocks in the image generation method in accordance with the first embodiment of the present invention.

FIG. 5 is a view illustrating one example of the method for extracting blocks "B" including a projected image "PI" of the primitive "P". As shown in FIG. 5, the blocks "B" including the projected image "PI" of the primitive "P" projected onto a picture plane "D" include Bm,n, Bm+1,n, Bm,n+1, and Bm+1,n+1. The method for determining these blocks includes to find out four vertices of a rectangle (shown in dotted line) circumscribing the projected image "PI" of the primitive "P", and to determine a group of contiguous blocks including these vertices.

Figure 6:
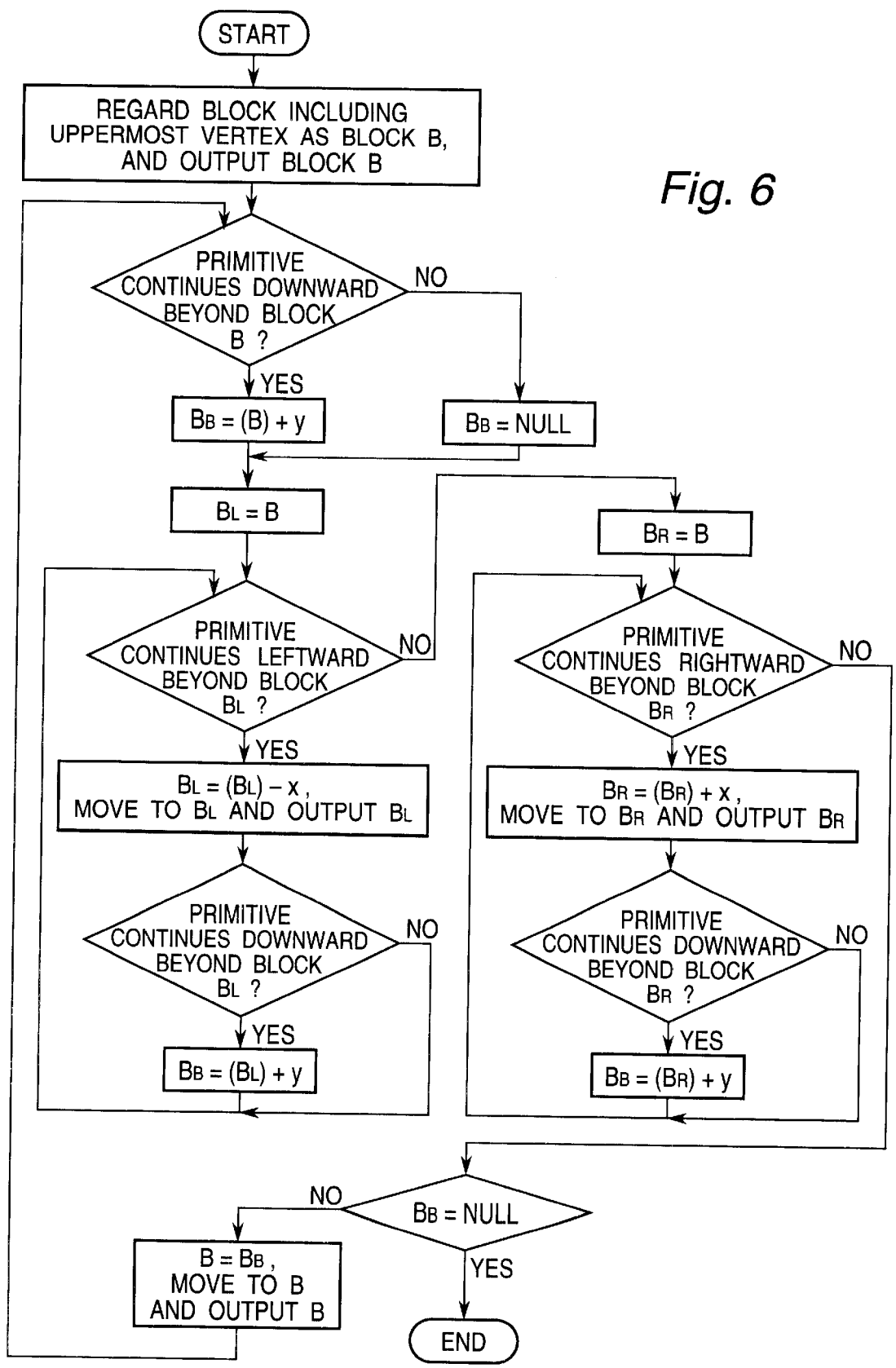
FIG. 6 is a flow chart illustrating one example of the method for extracting blocks including a projected image of the primitive, in the image generation method in accordance with the first embodiment of the present invention.

Alternatively, it is possible to extract a group of blocks including the projected image "PI" of the primitive "P", in accordance with an algorithm as shown in FIG. 6. FIG. 6 is a flow chart illustrating the flow of the method for extracting the blocks "B" including the projected image "PI" of the primitive "P". Here, assume that the block, positioned at an upper left corner of the picture plane "D" is B0,0, and the block which is positioned at an "m"th location counted from the block B0,0 in a right direction and at an "n"th location counted from the block B0,0 in a downward direction, is Bm,n (m and n are integer). At this time, ( )-x, ( )+x and ( )+y are defined by (Bm,n)-x=Bm-1,n, (Bm,n)+x=Bm+1,n, and (Bm,n)+y=Bm,n+1, respectively. Now, the algorithm shown in FIG. 6 will be described. First, the block including an uppermost vertex is deemed as "B", and the block "B" is outputted. Then, whether or not the primitive continues downward beyond the block "B", is discriminated. If it does not continue, "NULL" is substituted for BB, and if it continues, (B)+y is substituted for BB. Furthermore, BL is substituted for B. Then, whether or not the primitive continues leftward beyond the block BL, is discriminated. If it continues, (BL)-x is substituted for BL. The processing goes into BL, and BL is outputted. In addition, if the primitive continues downward beyond the block BL, (BL)+y is substituted for BB. If it does not continue, BB is maintained as it is. If the primitive continues leftward beyond the block BL, this processing is repeated. If the primitive no longer continues a block leftward beyond the block BL, BR is substituted for B. Then, whether or not the primitive continues a block rightward beyond the block BR, is discriminated. If it continues, (BR)+x is substituted for BR. The processing goes to BR and BR is outputted. If the primitive continues downward beyond the block BR, (BR)+y is substituted for BR. If it does not continue, BB is maintained as it is. Unless the primitive continues rightward beyond the block BR, this processing is repeated. Then, whether or not BB is "NULL" is discriminated. If BB is "NULL", all the processing is completed. If BB is not "NULL", BB is substituted for B, the processing goes into the block B, and B is outputted. The above mentioned processing is repeated by using B as a starting point.

Figure 7:
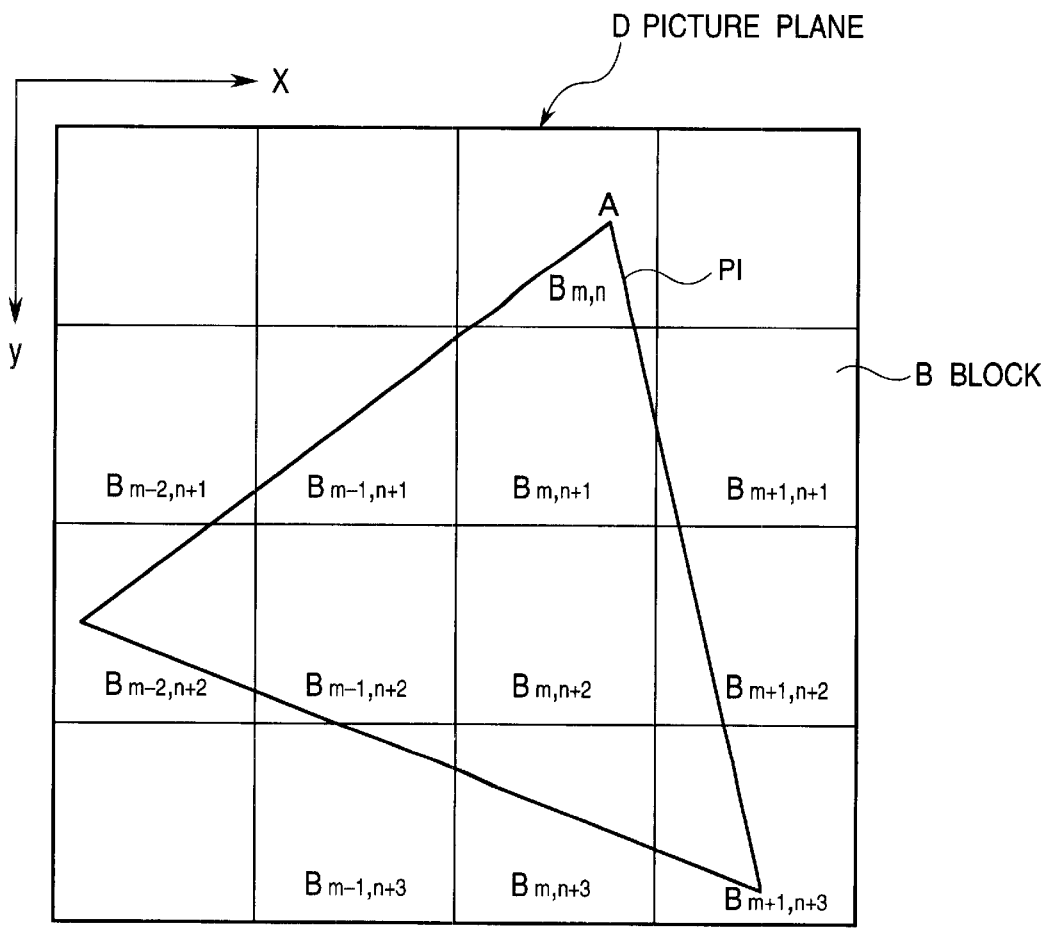
FIG. 7 is a view illustrating one example of the order for extracting blocks including the primitive, in the image generation method in accordance with the first embodiment of the present invention.

FIG. 7 is a view illustrating one example of the order for extracting a group of blocks including the projected image "PI" of the primitive "P", in accordance with the flow chart shown in FIG. 6. As shown in FIG. 7, in accordance with the flow chart shown in FIG. 6, the group of blocks are extracted in order from the block Bm,n including an uppermost vertex "A" of the projected image "PI" of the primitive "P". Namely, the processing starts from the block Bm,n and moves to the block Bm,n+1 just below the block Bm,n, and further, moves to the block Bm-1,n+1 and then to the block Bm2,n+1 unless the projected image "PI" exists at the left side. If the projected image "PI" does not exist at the left side, the processing goes to a right side block Bm+1,n+1. Furthermore, the processing goes to a block Bm+1,n+2 below the block Bm+1,n+1. The processing moves to the block Bm.n+2, and to the block Bm1,n+2, and then to the block Bm-2,n+2 until the projected image "PI" disappears from the left side. Furthermore, the processing moves to the blocks Bm-1,n+3, Bm,n+3, and Bm+1,n+3 therebelow.

Figure 8:
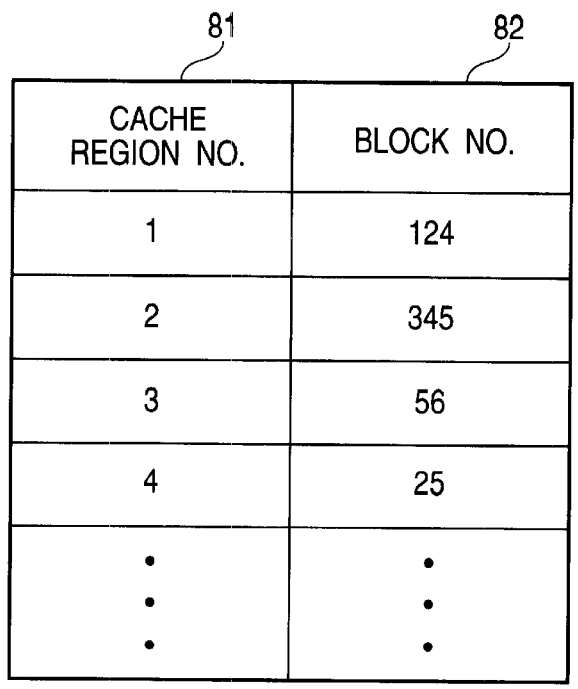
FIG. 8 is a view illustrating one example of the method for investigating whether or not the pixel values of the block exist in a cache memory, in the image generation method in accordance with the first embodiment of the present invention.

FIG. 8 is a view illustrating one example of the method for investigating whether or not the pixel values of some block "B" are stored in the cache memory 27. As shown in FIG. 8, a table is used to associate a cache region number 81 indicating a region position in the cache memory 27, with a block number 82 indicating the position of the block "B" in the picture frame "D." This table can be prepared by writing, at each time the pixel values of a new block "B" are written, the block number indicating the new block "B," in the block number 82 corresponding to the cache region in which the pixel values of the new block "B" are written. In addition, whether or not some block "B" exists in the cache memory 27 can be discriminated by checking all the block numbers included in this table.

Figure 9:
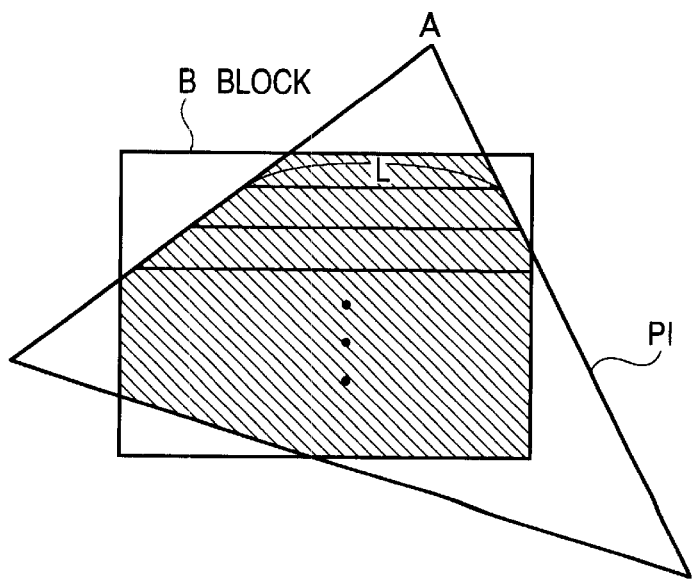
FIG. 9 is a view illustrating an in-block span in the image generation method in accordance with the first embodiment of the present invention.

FIG. 9 is a view illustrating the in-block span "L". As shown in FIG. 9, the in-block span "L" is a segment of a scan line included in an overlapping region (shown by hatching) between the block "B" and the projected image "PI" of the primitive "P". This in-block span "L" can be obtained by determining an intersection between the overlapping region and the scan line, by means of an interpolation, from the value of the vertex "A" of the projected image "PI" of the primitive "P". Specifically, if the intersection between the projected image "PI" of the primitive "P" and the scan line is within the block "B", the value of the position of the intersection is calculated by means of the interpolation, from the value of the vertex "A" of the projected image "PI" of the primitive "P". If the intersection is out of the block "B", an intersection between the scan line and a block boundary is determined, and the value of the determined intersection is calculated by means of the interpolation, from the value of the vertex "A" of the projected image "PI" of the primitive "P".

Now, an operation of the image generating method and apparatus thus constructed in accordance with the first embodiment of the present invention will be described.

First, in the step S101 for initializing the cache, the cache controller 26 prepares in the memory 28, the Z buffer 29 and the frame memory 30 respectively storing the depth value indicating the distance from a viewpoint, of each of pixels included in the picture frame "D" composed of a matrix of pixels, and the brightness value indicating the brightness of each pixel. Furthermore, the cache controller 26 initializes into an empty condition, the cache memory 27 for storing, as the pixel values, the depth values and the brightness values of each of pixels of a plurality of blocks. The plurality of blocks are rectangular blocks "B" of the same size divided from the picture frame "D". Information stored in the cache memory 27 includes the pixel values composed of the depth values stored in the Z buffer 29 and the brightness values stored in the frame buffer 30. The initialization can be carried out by bringing the brightness value to a fixed value or an arbitrary set value designated by a user. In addition, the depth values can be initialized to a value indicating a farthest position from the viewpoint, or to an arbitrary set value designated by the user.

In the step S102 for discriminating whether or not the primitive exists, the block segmenting section 22 takes from the primitive setting section 21, a primitive which is one of primitives "P" (which are primitive elements constituting the three-dimensional object "O") and which has not yet been taken out of the primitive setting section 21. If no more primitives exist, the processing goes into the step S108 for exhausting the cache content, as an ending processing. The primitives can be taken out by numbering the primitives "P" and taking out the primitives in the order of the number.

In the step S103 for extracting the projected block, the block segmenting section 22 takes out all blocks "B" including the projected image "PI" obtained when the primitive "P" taken out in the step S102 is projected onto the picture plane "D".

Then, in the step S104 for discriminating whether or not the block exists, the block segmenting section 22 takes out one of the blocks "B" taken out in the step S103 for extracting the projected block, and supplies the block information of the taken-out block to the cache controller 26. If no more blocks exist, the processing returns to the step S102 for discriminating whether or not the primitive exists.

In the step S105 for replacing the cache content, the cache controller 26 investigates whether or not in the cache memory 27 there exist the pixel values of the block "B" obtained in the step S104. If the pixel values do not exist, the cache controller 26 ensures a region corresponding to one block, and writes corresponding pixel values stored in the Z buffer 29 and the frame buffer 30, into the ensured region. If the ensured region already stores the pixel values of another block, the cache controller 26 writes pixel values of the another block into the Z buffer 29 and the frame buffer 30.

In the step S106 for generating an in-block span, the block segmenting section 22 derives from the primitive information, the in-block span information obtained when the projected image "PI" of the primitive "P" is segmented into a collection of in-block spans "L" so that the projected image "PI" of the primitive "P" completely falls in the block "B", and then, stores the derived in-block span information into the in-block span storing section 23. The in-block span information can be expressed by the coordinate value and the brightness value of opposite ends of the in-block span "L" when the vertex "A" of the projected image "PI" of the primitive "P" is given the brightness value. When the vertex "A" of the projected image "PI" of the primitive "P" is given an address in a table storing the brightness values, the in-block span information can be expressed by the coordinate value and the table address of the in-block span "L". Alternatively, it can be expressed by the coordinate value of a left end of the in-block span "L" and an increment value in the scan line direction.

In the step S107 for generating the block image, the pixel processing section 24 calculates the depth value and the brightness value of each of pixels included in the in-block span "L", from the in-block span information stored in the in-block span storing section 23. The depth value of each pixel is derived by an interpolation from the end of the in-block span "L". When the in-block span "L" is given the brightness value, the brightness value of each pixel can be derived by an interpolation, similarly to the depth value. When the address in the table storing the brightness values is given, the brightness value can be obtained by determining an address value for each pixel by an interpolation, and then by referring to the brightness value table in accordance with the determined address. This method for obtaining the brightness value by referring to the table is called a texture mapping.

Next, the pixel processing section 24 executes the hidden surface removal within the block "B", on the basis of the depth values and the brightness values obtained as mentioned above and the depth values and the brightness values stored in the cache memory 27. The hidden surface removal executed here is called a "Z-buffer method". The depth value of the pixel position obtained is compared with the depth value of a corresponding pixel position stored in the cache memory 27, and the brightness value of the pixel of the depth value nearer to the viewpoint is preserved in the cache memory 27.

The above mentioned series of proceedings are executed for all blocks "B" including the projected image "PI" of the primitive "P", and furthermore, are executed for all primitives "P" constituting the three-dimensional object "O".

Finally, in the step S108 for exhausting the cache content, the cache controller 26 writes the brightness values remaining in the cache memory 27 into the frame buffer 30, whereby an image is generated in the frame buffer 30.

As mentioned above, in the image generating method and apparatus of the first embodiment, the hidden surface removal based on the Z-buffer method is executed by temporarily fetching the pixel values into the cache memory 27. This cache memory 27 has the memory capacity corresponding to a plurality of blocks "B", and executes a data transfer to and from the Z buffer 29 and the frame buffer 30, in units of block. In addition, the primitive is segmented into the in-block spans "L" so that the primitive "P" is necessarily falls in one block "B". Therefore, after the processing for one block "B" has been completed for the time being, the processing can go into the processing for another block "B". Since the data transfer between the Z buffer 29 as well as the frame buffer 30 and the cache memory 27 can be necessarily executed in units of block, and therefore, since a page mode of the memory 28 can used, the Z buffer 29 and the frame buffer 30 can be always speedily accessed under a simple control, and therefore, a high speed data transfer can be performed.

In addition, with use of the cache memory 27, if a cache is hit, the number of accesses to the Z buffer 29 and the frame buffer 30 is reduced. Thus, it is possible to reduce the number of accesses to the Z buffer 29 and the frame buffer 30, and overcome a cause of hindering high speed image generation. Namely, the image generation can be carried out at a speed higher than the prior art in which the Z buffer 29 and the frame buffer 30 are accessed every time. Furthermore, control of the memory 28 becomes easier than the prior art. Therefore, the high speed image generated can be realized even with a low-cost memory 28, and therefore, a low-cost, high-speed system can be realized.

Furthermore, if the cache controller 26 performs a block transfer control, which will be described hereinafter, it is possible to reduce the amount of data transfer between the memory 28 and the cache memory 27. This processing is particularly effective in the case that the memory 28 and the cache memory 27 are included in different modules, respectively, so that a satisfactory data transfer performance cannot be obtained.

Figure 10:
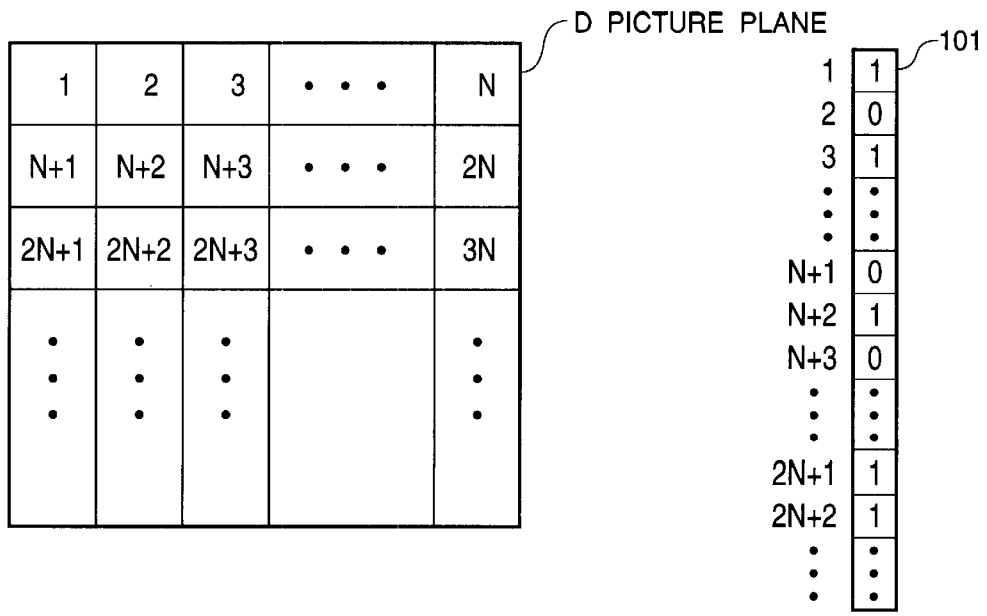
FIG. 10 is a view illustrating a method for a block transfer control in the first embodiment of the image generation method in accordance with the present invention.

FIG. 10 is a view illustrating the method for the block transfer 15 control. As shown in FIG. 10, respective blocks "B" of the picture frame "D" are numbered as 1, 2, 3, . . . , N+1, N+2, N+3, . . . , 2N+1, 2N+2, 2N+3. . . Furthermore, there is prepared a block valid table 101 capable of storing "0" or "1" in correspondence to each block number, and "0" is stored in all columns in the table 101 as an initial value. The cache controller 26 investigates, on the basis of the block information supplied from the block segmenting section 22, whether or not the brightness values and the depth values of the received block "B" are included in the cache memory 27. If they are not included, the cache controller 26 checks the block valid table 101, and investigates the value in the column of the block valid table 101, corresponding to the received block "B". If the value is "1", the cache controller 26 reads out the pixel values from the memory 28 and writes the read-out pixel values into the cache memory 27. If the value is "0", the cache controller 26 writes a predetermined initial value into the cache memory 27, and rewrites to "1" the value in the column of the block valid table 101, corresponding to the received block "B".

The above mentioned processing is so that the predetermined initial value is written for a block "B" to be used at a first place, and for a block "B" used at second and succeeding places, the pixel values of the memory 28 are read and written. This processing makes it unnecessary to read from the memory 28 the depth values and the brightness values for the block "B" to be used at a first place, and therefore, it is possible to reduce the amount of data transfer between the cache memory 27 and the memory 28.

Alternatively, if the cache memory 26 performs an image writing control which will be described hereinafter, it is also possible to reduce the amount of data transfer between the memory 28 and the cache memory 27. This processing is also particularly effective in the case that the memory 28 and the cache memory 27 are included in different modules, respectively, so that a satisfactory data transfer performance cannot be obtained.

Figure 11:
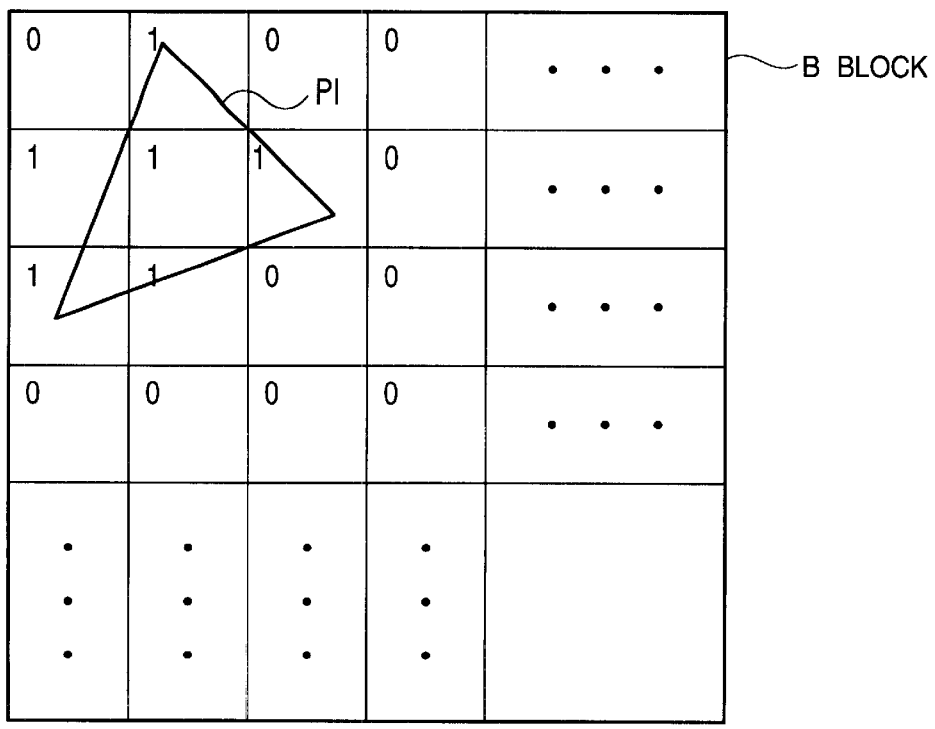
FIG. 11 is a view illustrating a method for an image writing control in the image generation method in accordance with the first embodiment of the present invention.

FIG. 11 is a view illustrating the method for the image writing control. As shown in FIG. 11, a valid bit is provided for each of the pixels included in each block "B" stored in the cache memory 27, and "1" is set to a pixel on which an image is drawn, and "0" is set to a pixel on which no image is drawn. For example, the projected image "PI" of the primitive "P" is drawn in the block "B", the valid bits of all pixels are firstly set to "0", and the valid bits of pixels on which the projected image "PI" of the primitive "P" is drawn, are brought to "1". When the pixel values of the cache memory 27 are written to the memory 28, only the pixel values of the pixels having the valid bit of "1" are written to the memory 28.

This processing control has such an advantage that it is not necessary to read the brightness value from the memory 28 and to write the same to the cache memory 27. Namely, when it is found on the basis of the block information supplied from the block segmenting section 22, that the brightness values and the depth values of the received block "B" are not included in the cache memory 27, it is sufficient if only the depth values are read from the memory 28 and written into the cache memory 27, and therefore, it is no longer necessary to read the brightness values. The reason for this is that, the depth values are required to be compared with the Z buffer 29 for the hidden surface removal, but the brightness values are not required. Thus, it becomes unnecessary to read the brightness values from the memory 28 and to write the same to the cache memory 28, and therefore, the amount of data transfer between the memory 28 and the cache memory 27 can be reduced.

Figure 12:
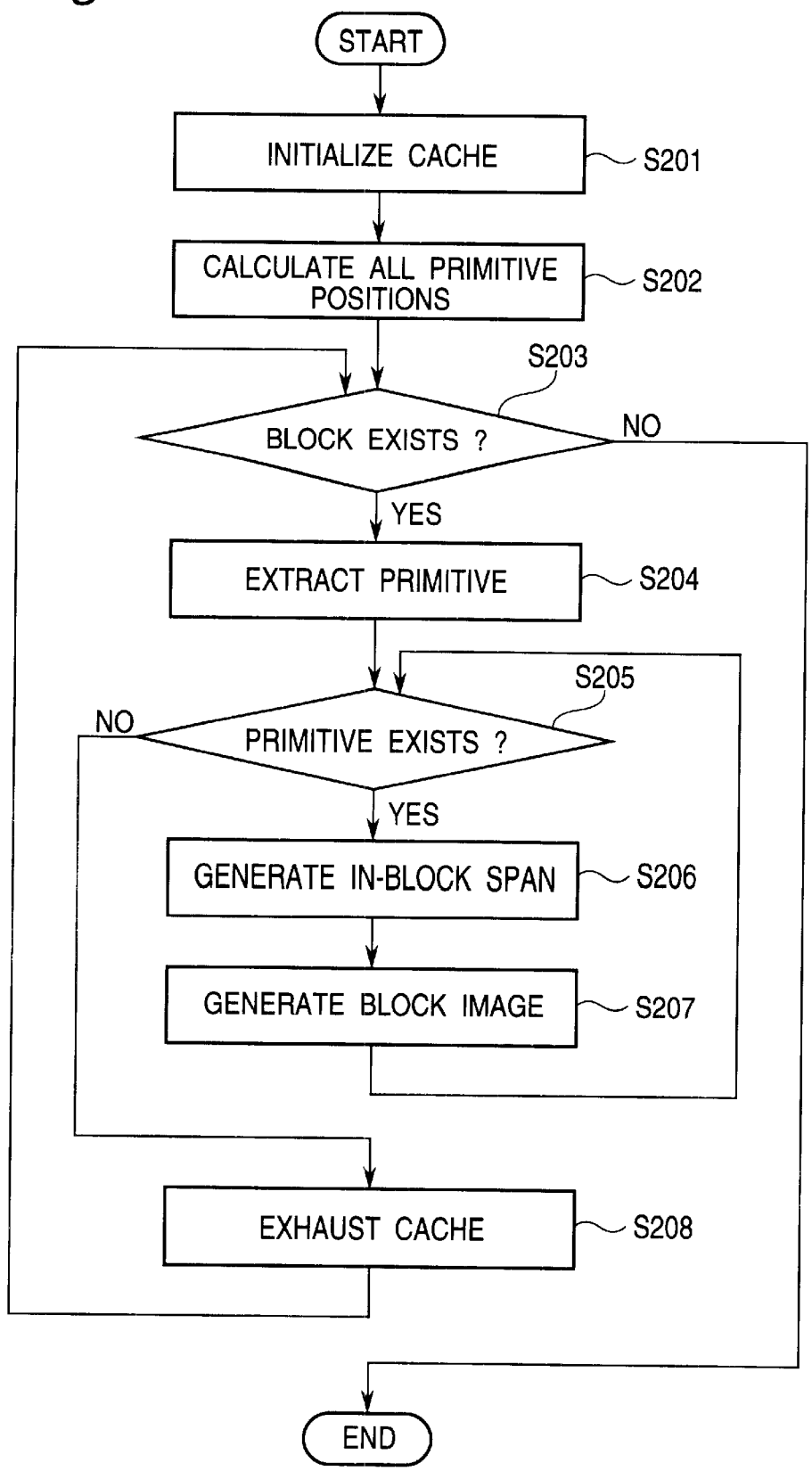
FIG. 12 is a flow chart illustrating the process of the image generation method in accordance with a second embodiment of the present invention.

FIG. 12 is a flow chart illustrating the process of the image generation method in accordance with a second embodiment of the present invention. The image generation method in accordance with the second embodiment of the present invention further elevates the cache hit rate in the image generation method in accordance with the first embodiment of the present invention, and also makes the Z buffer of one frame unnecessary. As shown in FIG. 12, this image generation method includes a step S201 for initializing a cache, a step S202 for calculating all primitive positions, a step S203 for discriminating whether or not a block exists, a step S204 for extracting the primitive, a step S205 for discriminating whether or not a primitive exists, a step S206 for generating an in-block span, a step S207 for generating a block image, and a step S208 for exhausting the cache content.

Figure 13:
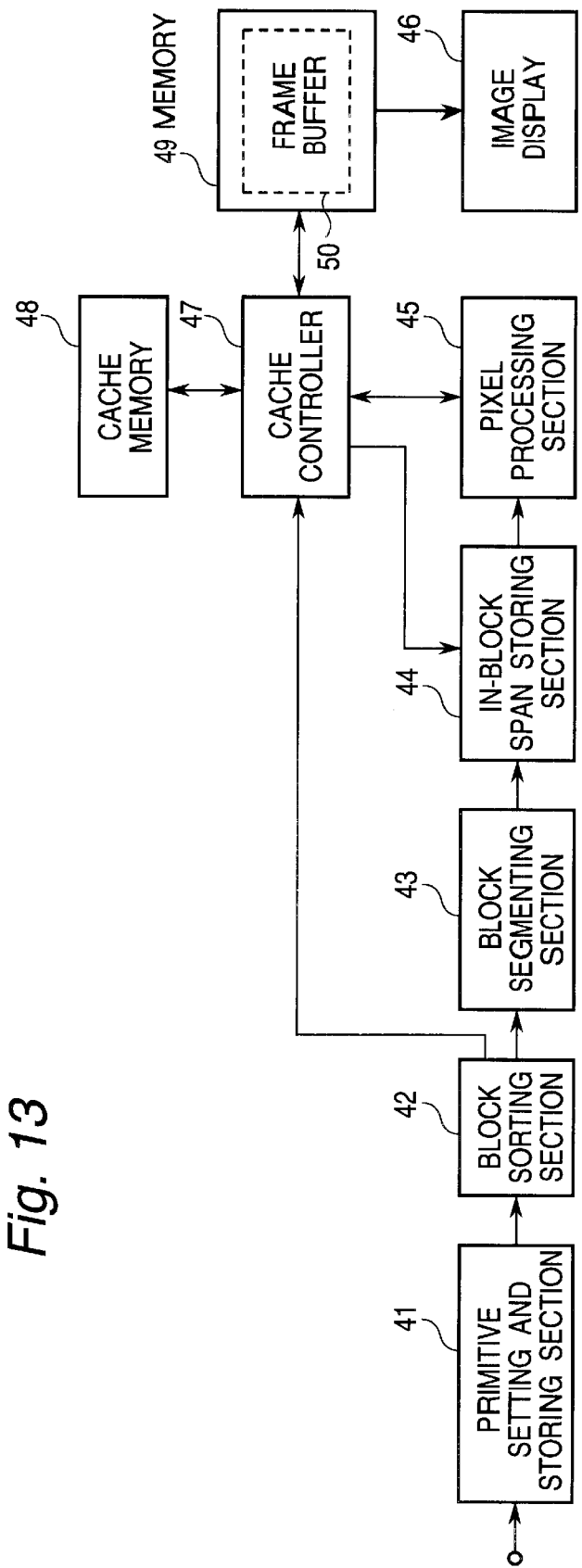
FIG. 13 is a block diagram showing of the image generation apparatus in accordance with the second embodiment of the present invention.

FIG. 13 is a block diagram showing the image generation apparatus in accordance with the second embodiment of the present invention applied with the image generation method shown in FIG. 12. As shown in FIG. 13, this image generation apparatus comprises a primitive setting and storing section 41, a block sorting section 42, a block segmenting section 43, an in-block span storing section 44, a pixel processing section 45, an image display 46, a cache controller 47, a cache memory 48 and a memory 49. The cache memory 48 is formed, for example, of SRAM, and the memory 49 is formed, for example, of DRAM.

The primitive setting and storing section 41 receives and stores primitive information indicating primitives "P" constituting a three-dimensional object "O". The method for inputting the primitive information is similar to the primitive setting section 21 in the image generating apparatus of the first embodiment.

The block sorting section 42 investigates the blocks "B" of the picture frame "D" in the order of arrangement, to find out the primitive "P" having possibility being displayed in the block, and to supply it to the block segmenting section 43. In addition, the block segmenting section 43 supplies the position of the noticeable block "B", as block information, to the block segmenting section 43 and also to the cache controller 47.

The block segmenting section 43 operates on the basis of the block information, to segment the primitive "P" into in-block spans "L", and causes the in-block span storing section 44 to store in-block span information, similarly to the block segmenting section 22 in the image generating apparatus of the first embodiment.

The in-block span storing section 44, the pixel processing section 45 and the image display 46 are completely similar to the in-block span storing section 23, the pixel processing section 24 and the image display 25 in the image generating apparatus of the first embodiment, respectively.

The cache controller 47 is also similar to the cache controller 26 in the image generating apparatus of the first embodiment. However, since no depth value is stored in the memory 49, the cache controller 47 does not perform a control for reading the depth values from the memory 49 and for writing the depth values to the memory 49.

The cache memory 48 is similar to the cache memory 27 in the image generating apparatus of the first embodiment.

The memory 49 is constituted of a frame buffer 50 having the memory capacity capable of storing the brightness value of each of pixels within the primitive "P", in the amount of one frame. Alternatively, the frame buffer can be modified to have the memory capacity corresponding to two frames, so that when one of the two frames is displayed, the image generation of the other frame can be performed.

Now, an operation of the image generating method and apparatus thus constructed in accordance with the second embodiment will be described.

In the step S201 for initializing the cache, the cache controller 47 initializes the cache memory 48, completely similar to the step S101 for initializing the cache, in the image generating method in accordance with the second embodiment. The method for dividing the picture frame and the constructing method of the cache memory 48 are completely similar to the first embodiment.

Next, in the step S202 for calculating all primitive positions, the block sorting section 42 receives information from the primitive setting and storing section 41, and determines position information indicating a block "B" having possibility of including the projected image "PI" of the primitive "P". For example, this position information can be constituted of block positions of an upper left corner block and a lower right corner block of a minimum rectangle containing the primitive "P". In the example shown in FIG. 5, those blocks are the block Bm,n and the block Bm+1,n+1.

In the step S203 for discriminating whether or not the block exists, the block segmenting section 43 extracts the blocks "B", one after one, in the order which starts from the upper left corner block in the picture frame "D" and advancing in a right-hand direction one by one and which shifts to a leftmost block in an adjacent lower block row if the block no longer exists in the right-hand direction. In this manner, the blocks "B" in the picture "D" are extracted one by one. At each time one block "B" in the picture "D" is extracted up, the processing goes into the step S204 for extracting the primitive. Then, if there becomes no block to be extracted up, the block segmenting section 43 completes the processing.

In the step S204 for extracting the primitive, the block segmenting section 43 extracts all the primitives "P" each having possibility that the projected image "PI" of the primitive "P" is included in the block "B" extracted in the step S203 for discriminating whether or not the block exists. For example, since all the blocks each having possibility including the projected image "PI" of the primitive "P" can be known from the block positions obtained in the step S202 for calculating all primitive positions, for all the primitives "P" it is sufficient if there is discriminated whether or not the block "B" extracted in the step S203 is contained in the blocks of the block positions obtained in the step S202. In the example shown in FIG. 5, since it is known that the blocks Bm,n, Bm+1,n, Bm,n+1 and Bm+1,n+1 the possibility of containing the projected image "PI" of the primitive "P", it is sufficient to discriminate whether or not the block concerned is included in these blocks Bm,n, Bm+1,n, Bm,n+1 and Bm+1,n+1.

However, a high speed processing cannot be realized if the above mentioned discrimination were executed for all the primitives "P" in each of the blocks "B". Therefore, in the step S202 for calculating all primitive positions, a primitive sort list can be prepared, and the primitive(s) "P" included in each block "B" can be extracted up.

Figure 14:
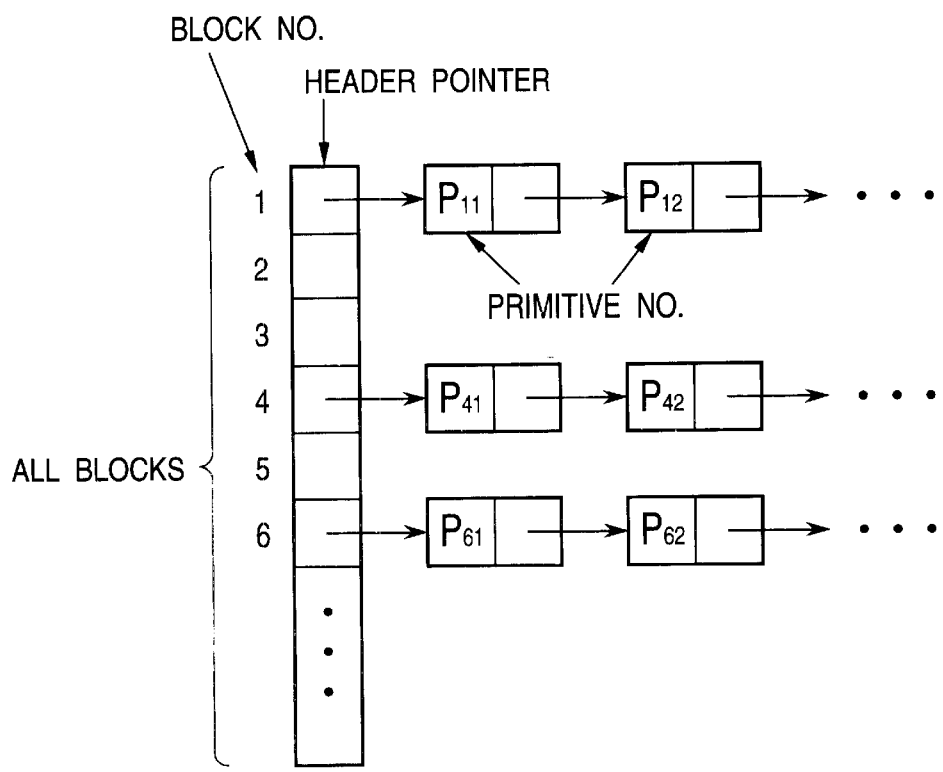
FIG. 14 is a view illustrating one example of the primitive sort list used in the image generation method in accordance with the second embodiment of the present invention.

FIG. 14 is a view illustrating one example of the primitive sort list. As shown in FIG. 14, the primitive sort list includes header pointers of the number corresponding to the number of blocks in the picture frame "D." Each header pointer is linked to a primitive number so that the block "B" corresponding to the header pointer includes the left upper corner of the primitive. In the example shown in FIG. 5, the block numbers corresponding to the shown primitive are linked to the header pointer corresponding to the block Bm,n.

Now, the method for extracting the primitives having possibility being included in the block "B", by use of the primitive sort list, will be described. This processing is performed in the step S204 for extracting the primitive. In the step S203 for discriminating whether or not the primitive exists, the block extracting order starts from the upper left corner in the picture plane "D" to advance in a right-hand direction and returns to a leftmost block in an adjacent lower block row if it reaches the rightmost position. Therefore, in this order, the primitives are extracted.

The block segmenting section 43 retrieves the header list corresponding to the upper left corner block "B" in the picture frame "D", and extracts all the primitives "P" having possibility of being included in the block "B". At this time, when there is possibility that the extracted primitive "P" is included in an adjacent right-side block "B", the block segmenting section 43 adds the number of the primitive "P" to the header list corresponding to the adjacent right-side block "B". Alternatively, when there is no possibility that the extracted primitive "P" is included in an adjacent right-side block "B", but when there is possibility that the extracted primitive "P" is included in an adjacent lower-side block "B", the block segmenting section 43 adds the number of the primitive "P" to the header list corresponding to a leftmost block "B" which has possibility including the extracted primitive "P" and which is included in an adjacent lower-side block row.

Then, the block segmenting section 43 goes into a processing for extracting the primitive "P" having possibility of being included in the adjacent right-side block "B". In this processing for the adjacent right-side block "B", all primitives "P" having possibility of being included in the adjacent right-side block "B", can be extracted by retrieving the header list corresponding to the adjacent right-side block "B", similarly to the processing for the upper left corner block "B". At this time, when there is possibility that the extracted primitive "P" is included in an adjacent block "B" at a right side of the adjacent right-side block "B", the block segmenting section 43 adds the number of the primitive "P" to the header list corresponding to the second adjacent right-side block "B". Alternatively, when there is no possibility that the extracted primitive "P" is included in the second adjacent right-side block "B", but when there is possibility that the extracted primitive "P" is included in an adjacent lower-side block "B", the block segmenting section 43 adds the number of the primitive "P" to the header list corresponding to a leftmost block "B" which has possibility including the extracted primitive "P" and which is included in an adjacent lower-side block row.

The above mentioned processing for the block "B" is conducted from the upper left corner block "B" of the picture frame "D" to a right-side block "B", and if the processing reaches to a right end, the processing goes to a leftmost block in an adjacent lower block row. Thus, all primitives having possibility of being included in any block, can be extracted.

Succeeding, in the step S205 for discriminating whether or not the primitive exists, the block segmenting section 43 takes out one primitive "P" from a collection of primitives which are obtained in the step S204 for extracting the primitive and which have possibility of being included in one block "B", and then, executes the step S206 for generating the in-block span for the taken-out primitive "P". If there is no primitive to be taken out, the processing goes into the step S208 for exhausting the cache content.

The step S206 for generating the in-block span, the step S207 for generating the block image, and the step S208 for exhausting the cache content, are executed completely similar to the step S106 for generating the in-block span, the step S107 for generating the block image, and the step S108 for exhausting the cache content, in the image processing method of the first embodiment.

As mentioned above, since the image generating method and apparatus of the second embodiment are configured to execute, for each one block "B", the processing of all the in-block spans included in that block "B", the processing does not go into the processing for another block unless the processing for that block "B" has been perfectly completed. Thereafter, if the pixel values for that block "B" have been written into the frame buffer 50 from the cache memory 48 at once, since the same pixel values are never written into the cache memory 48, the cache hit rate is elevated, and the amount of data transfer between the cache memory 48 and the memory 49 can be reduced. In addition, since the access to the Z buffer is not carried out in this processing, the Z buffer is not required.

As explained above, since the hidden surface removal based on the Z-buffer method is carried out by fetching the pixel values into the cache memory at once, and since the primitive is segmented into the in-block spans so that the primitive necessarily completely falls in one block, it is possible that after the processing for one block is completed, the processing goes into the processing for another block. Therefore, the data transfer between the cache memory and the Z buffer as well as the frame buffer can be executed necessarily in units of block, and therefore, the page mode of the memory can always be utilized, with the result that a high speed data transfer can be advantageously realized with a simple control.

Furthermore, if the cache is hit, the number of accesses to the Z buffer or the frame buffer can be reduced, and therefore, a high speed image generation can be realized in comparison with the prior art in which the Z buffer or the frame buffer is accessed every time. In addition, the memory control advantageously becomes easy.

What is claimed is:

1. An image generation method for generating a hidden surface removed image, an object located in a three-dimensional space being defined as a collection of primitives which are fundamental shapes, and a hidden surface removal being conducted on the basis of a depth value indicating a distance from a viewpoint to each of pixels in a picture frame composed of pixels arranged in the form of matrix, the method including:

dividing said picture frame into a plurality of rectangular blocks having equal shapes and sizes, preparing a cache memory for storing a brightness value and a depth value of each pixel, in the amount of at least one block, and repeating a processing including to segment a portion of each primitive into a collection of in-block spans which are completely included in one block so that a projected image of said portion is completely included in said one block, and to generate on the basis of said collection of in-block spans a hidden surface removed block image in said cache memory, whereby an image of one picture frame is generated.

2. An image generation method for generating a hidden surface removed image, an object located in a three-dimensional space being defined as a collection of primitives which are fundamental shapes, and a hidden surface removal being conducted by using a Z buffer and a frame buffer, which correspond to position of pixels in a picture frame composed of pixels arranged in the form of matrix, and which respectively store a depth value indicating a distance from a viewpoint to each pixel and a brightness value indicating a brightness of each pixel, on the basis of said depth value, the method including:

a cache initializing step for initializing into an empty condition a cache memory capable of storing pixel values in the amount of at least one rectangular block of a plurality of rectangular blocks having equal shapes and sizes obtained when said picture frame is divided into said plurality of rectangular blocks;

a step for discriminating whether or not a primitive exists, in which if in all said primitives constituting said object there exists a primitive which has not yet been extracted, said primitive is extracted, and if there is no primitive which has not yet been extracted, the processing goes into an ending processing;

a projected block extracting step for extracting all blocks including a projected image of said primitives projected onto said picture frame;

a step for discriminating whether or not a block exists, in which if in all said blocks including the projected image of said primitives projected onto said picture frame, there exists a block which has not yet been extracted, said block is extracted, and if there is no block which has not yet been extracted, the processing returns into said step for discriminating whether or not the primitive exists;

a cache replacement step in which if said pixel values of said extracted block are not stored in said cache memory, said pixel values of said extracted block are written into said cache memory, and when said cache memory stores said pixel values of another block and therefore said pixel values of said extracted block are overwritten into said cache memory, said pixel values of said another block are written into said Z buffer and said frame buffer;

an in-block span generating step for seeking in-block span information obtained when said primitive is segmented into a collection of in-block spans so that a projected image of said primitive completely falls in said extracted block;

a block image generating step for obtaining the pixel values of the pixels included in said in-block spans from said in-block span information, comparing said depth values of said pixel values with the depth values of said extracted block stored in said cache memory, and preserving, in said cache memory, the pixel values of the in-block spans which can be viewed from said viewpoint, and then, returning to said step for discriminating whether or not the block exists; and a cache exhausting step for writing the brightness values stored in said cache memory into said frame buffer, as said ending processing in said step for discriminating whether or not the primitive exists.

3. An image generation method claimed in claim 2 wherein in said cache replacement step, if said pixel values of said extracted block are not stored in said cache memory, said pixel values of said extracted block are written into said cache memory, and when said cache memory stores said pixel values of another block and therefore said pixel values of said extracted block are overwritten into said cache memory, only modified pixel values of said pixel values of said another block are written into said Z buffer and said frame buffer.

4. An image generation method for generating a hidden surface removed image, an object located in a three-dimensional space being defined as a collection of primitives which are fundamental shapes, and a hidden surface removal being generated, in a frame buffer which corresponds to pixels in a picture frame composed of pixels arranged in the form of matrix and which stores a brightness value indicating a brightness of each pixel, on the basis of a depth value indicating a distance from a viewpoint of said primitive to each pixel, the method including:

a cache initializing step for initializing into an empty condition a cache memory capable of storing pixel values composed of said brightness values and said depth values of said pixels, in the amount of at least one rectangular block of a plurality of rectangular blocks obtained when said picture frame is divided into said plurality of rectangular blocks having equal shapes and sizes;

an all-primitive position calculating step for determining and storing, for all said primitives, position information indicating a block having possibility of including a projected image of each primitive;

a step for discriminating whether or not a block exists, in which if in all said blocks constituting said picture frame, there exists one or more blocks which have not yet been extracted, one block is extracted in an arrangement order on said picture frame;

a primitive extracting step for extracting, on the basis of said position information, all primitives each having possibility that a projected image of that primitive is included in said extracted block;

a step for discriminating whether or not a primitive exists, in which if in all said primitives extracted, there exists a primitive which has not yet been extracted, said primitive is extracted, and if there is no primitive which has not yet been extracted, the processing goes into an ending processing;

an in-block span generating step for seeking in-block span information obtained when said extracted primitive is segmented into a collection of in-block spans so that a projected image of said extracted primitive completely falls in said extracted block;

a block image generating step for obtaining, from said in-block span information, the pixel values of the pixels included in said in-block spans from said in-block span information, comparing said depth values of said pixel values with the depth values of said extracted block stored in said cache memory, and preserving, in said cache memory, the pixel values of the primitive which can be viewed from said viewpoint, and then, returning to said step for discriminating whether or not the primitive exists; and a cache exhausting step for writing the brightness values stored in said cache memory into said frame buffer, and initializing said cache memory into said empty condition, as said ending processing in said step for discriminating whether or not the primitive exists, and then, for returning to said step for discriminating whether or not the block exists.

5. An image generation apparatus comprising:

a primitive setting section for setting primitive information indicating each of primitives when an object located in a three-dimensional space is defined as a collection of primitives which are fundamental shapes, a memory including a Z buffer and a frame buffer, which respectively store a depth value indicating a distance from a viewpoint to each of pixels of said picture frame and a brightness value indicating a brightness of each pixel;

a cache memory capable of storing pixel values each composed of said depth value and said brightness value of each pixel, in the amount of at least one rectangular block of a plurality of rectangular blocks having equal shapes and sizes obtained when said picture frame is divided into said plurality of rectangular blocks;

a block segmenting section for seeking, on the basis of said primitive information, in-block span information obtained when said primitive is segmented into a collection of in-block spans so that a projected image of said primitive completely falls in one block, said block segmenting section also seeking block information indicating a block including a projected image of said primitive projected onto said picture frame;

an in-block span storing section for storing said in-block span information;

a cache controlling section operating on the basis of said block information to writing said pixel values of said block into said cache memory from said memory if said pixel values of said block are not stored in said cache memory, said cache controlling section operating, when said cache memory stores said pixel values of another block and therefore said pixel values of said block are overwritten into said cache memory, to write said pixel values of said another block into said memory, said cache controlling section reading from said in-block span storing section said in-block span information indicating the in-block span projected onto said block;

a pixel processing section for seeking from said in-block span information the pixel value of the pixel included in said in-block span, and reading out the depth value in said block stored in said cache memory by action of said cache controlling section, to compare the read-out depth value with said depth value of said pixel, and further writing the pixel values which can be viewed from said viewpoint, into in said cache memory by action of said cache controlling section; and an image display for displaying the image stored in said frame buffer.

6. An image generation apparatus claimed in claim 5 wherein said cache controlling section has a flag indicating whether or not each block has been used, and performs such a control that for a block which has not yet been used, the pixel values are not read out from said memory to be written into said cache memory.

7. An image generation apparatus claimed in claim 5 wherein said cache controlling section performs such a control that when said pixel values of said another block are written into said memory, unmodified pixels values are not written into said memory.

8. An image generation apparatus claimed in claim 5 wherein said cache controlling section has a flag indicating whether or not each block has been used, and performs such a control that for a block which has not yet been used, the depth values are not read out from said memory to be written into said cache memory.

9. An image generation apparatus comprising:

a primitive setting and storing section for setting and storing primitive information indicating each of primitives when an object located in a three-dimensional space is defined as a collection of primitives which are fundamental shapes, a memory storing a brightness value indicating a brightness of said primitive in each of pixels of said picture frame;

a cache memory capable of storing pixel values each composed of a depth value indicating a distance from a viewpoint to each pixel and said brightness value of each pixel, in the amount of at least one rectangular block of a plurality of rectangular blocks having equal shapes and sizes obtained when said picture frame is divided into said plurality of rectangular blocks;

a block sorting section for reading. from said primitive setting and storing section in the arrangement order of said blocks in said picture frame, said primitive information indicating said primitive having possibility that a projected image of said primitive is included in said block, said block sorting section generating an end information for notifying the ending of said block;

a block segmenting section for seeking, on the basis of said primitive information, in-block span information obtained when said primitive is segmented into a collection of in-block spans so that a projected image of said primitive completely falls in one block;

an in-block span storing section for storing said in-block span information;

a cache controlling section responding to said end information to read from said in-block span storing section said in-block span information indicating the in-block span projected onto said block, and for writing said brightness values stored in said cache memory into said frame buffer when the processing for said block is completed;

a pixel processing section for seeking from said in-block span information the pixel value of the pixel included in said in-block span, and reading out the depth value in said block stored in said cache memory by action of said cache controlling section, to compare the read-out depth value with said depth value of said pixel, and further writing the pixel values which can be viewed from said viewpoint, into in said cache memory by action of said cache controlling section; and an image display for displaying the image stored in said frame buffer.

10. An image generation apparatus comprising:

a primitive setting section for setting and storing primitive information of an object located in three-dimensional space;

a memory having a Z buffer and a frame buffer, wherein the Z buffer stores a depth value indicating a distance from a viewpoint to each of a plurality of pixels of the picture frame, and wherein the frame buffer stores a brightness value indicating a brightness of each pixel;

a cache memory capable of storing pixel values, each pixel value comprising said depth value and said brightness value, in the amount of at least one rectangular block of a plurality of rectangular blocks having equal shapes and sizes obtained when the picture frame is divided into the plurality of rectangular blocks;

a block segmenting section for seeking, on the basis of the primitive information, in-block span information obtained when said primitive is segmented into a collection of in-block spans so that a projected image of said primitive completely falls in one block, said block segmenting section also seeking block information indicating a block including a projected image of said primitive projected onto said picture frame;

an in-block span storing section for storing said in-block span information;

a cache controlling section operating on the basis of said block information for writing said pixel values of said block into said cache memory from said memory;

a pixel processing section for seeking from said in-block span information the pixel value of the pixel included in said in-block span, and reading out the depth value in said block stored in said cache memory by action of said cache controlling section, to compare the read-out depth value with said depth value of said pixel, and further writing the pixel values which can be viewed from said viewpoint, into said cache memory by action of said cache controlling section; and an image display for displaying the image stored in said frame buffer.

* * * * *